United States Patent [19]

Mochida et al.

[11] Patent Number: 4,888,147
[45] Date of Patent: Dec. 19, 1989

[54] PROCESS FOR PRODUCTION OF CELLULOSE ACETATE MOLDING MATERIALS

[75] Inventors: Naoki Mochida; Hiroaki Sawada, both of Toyama, Japan

[73] Assignees: Mitsubishi Rayon Co., Ltd.; Mitsubishi Acetate Co., Ltd., both of Tokyo, Japan

[21] Appl. No.: 254,767

[22] Filed: Oct. 7, 1988

[30] Foreign Application Priority Data

Oct. 8, 1987 [JP] Japan ................................. 62-252573
Oct. 9, 1987 [JP] Japan ................................. 62-253869

[51] Int. Cl.$^4$ ........................... D01F 2/02; D01F 2/30
[52] U.S. Cl. .................................... 264/207; 264/211; 264/211.11; 106/194; 106/196
[58] Field of Search .............................. 106/194, 196; 260/500.31; 264/200, 187, 207, 211, 211.11

[56] References Cited

U.S. PATENT DOCUMENTS 2,052,590 9/1936 Whitehead ........................... 264/211
2,966,422 12/1960 Grandner ............................ 106/196
3,347,689 10/1967 Futami et al. ....................... 106/194

FOREIGN PATENT DOCUMENTS 1911531 7/1969 Fed. Rep. of Germany ...... 264/207
55-26262 2/1980 Japan .
0876810 11/1981 U.S.S.R. ............................... 264/207

*Primary Examiner*—Hubert C. Lorin
*Attorney, Agent, or Firm*—Sughrue, Mion, Zinn, Macpeak & Seas

[57] ABSTRACT

A process for producing a cellulose acetate molding material which comprises dissolving cellulose diacetate in a mixed solvent of acetone and water to prepare a dope and then spinning or film forming the dope, wherein at least one compound selected from the group consisting of water-soluble salts and bases is added to the water to be used in preparation of the dope.

10 Claims, No Drawings

PROCESS FOR PRODUCTION OF CELLULOSE ACETATE MOLDING MATERIALS

FIELD OF THE INVENTION

The present invention relates to a process for production of molding materials such as fibers and films using cellulose acetate as a raw material.

BACKGROUND OF THE INVENTION

Cellulose acetate is a raw material widely used in various applications exemplified by films, fibers and the like.

In production of cellulose acetate on a commercial scale, a method using anhydrous acetic acid as an acetylating agent, acetic acid or methylene chloride as a diluent and sulfuric acid as a catalyst is commonly employed.

The above usual process of production of cellulose diacetate will hereinafter be explained.

High quality pulp having a high α-cellulose content is first beaten and then mixed with acetic acid and, thereafter, anhydrous acetic acid, acetic acid and sulfuric acid are added to achieve acetylation so that the cellulose is completely esterified. Then, a so-called aging treatment where hydrolysis is carried out until the acetyl value drops to about 55% is applied and then the cellulose diacetate thus obtained is isolated from the reaction system and finely divided and, thereafter, it is washed with water and dried to obtain cellulose diacetate flakes. Cellulose diacetate flakes adjusted to the desired viscosity and acetyl value have a very high solubility in acetone. Thus a 20 to 30 wt % solution of cellulose diacetate in acetone as a dope is passed through a filter and then extruded through a nozzle or die to evaporate the solvent, whereby it is molded into fibers or films.

In spinning or film molding of cellulose diacetate, however, acetone-insoluble gels are formed. These acetone-insoluble gels are responsible for fiber breakage and a reduction in the degree of stretching in fiber molding, and in film molding, and for the formation of fish eyes.

Thus, the removal of such acetone-insoluble gels is an important subject.

The present inventors made extensive investigations to find the mechanism by which the acetone-insoluble gels are formed, and a method of preventing the formation of acetone-insoluble gels. As a result, they have found that the acetone-insoluble gels are mainly made of cellulose acetate having a low acetyl value. Based on such findings, they investigated on a method of inhibiting the formation of cellulose acetate having a low acetyl value.

As a method of removing the component of a low acetyl value or the component of a low degree of polymerization contained in cellulose acetate, for example, an extraction method as disclosed in JP-B-48-23543 and JP-B-50-6229 (the term "JP-B" as used herein means an "examined Japanese patent publication") has been known.

The above extraction method, however, is unsuitable for practical use from an industrial point of view.

The present inventors have discovered that the formation of acetone-insoluble gels made of cellulose acetate having a low acetyl value is caused by the presence of a small amount of free acid in cellulose diacetate as obtained in the flake form and that the presence of hydrogen ion resulting from the free acid markedly accelerates the hydrolysis of cellulose acetate due to the thermal hydrolysis of the dope, thereby forming cellulose having a low acetyl value.

SUMMARY OF THE INVENTION

The present invention is intended to overcome the above problems and an object of the present invention is to inhibit the hydrolysis action of free acid remaining in cellulose diacetate, thereby preventing formation of acetone-insoluble gels and overcoming the problems of fiber breakage, formation of fish eyes and so on.

It has now been found that the above object is accomplished by a process for producing a cellulose acetate molding material which comprises dissolving cellulose diacetate in a mixed solvent of acetone and water to prepare a dope and then spinning or film forming the dope, wherein at least one compound selected from the group consisting water-soluble salts and bases is added to the water to be used in the preparation of the dope.

DETAILED DESCRIPTION OF THE INVENTION

In the present invention, cellulose diacetate must be dissolved in a mixed solvent of acetone and water. This means is well known as described in *Cellulose and Cellulose Derivatives,* Interscience Publishers, Inc., New York (1955).

The weight ratio of acetone to water contained in the mixed solvent of the present invention is in a range of preferably from 100:0 to 70:30, more preferably from 98:2 to 86:14.

In accordance with the present invention, the influence of hydrogen ion resulting from free acid remaining in cellulose diacetate is reduced by the use of a water-soluble salt or base, thereby inhibiting the hydrolysis action responsible for the formation of cellulose acetate having a low acetyl value, and thus the formation of insoluble gels can be prevented.

The water-soluble salt or base to be used in the present invention acts to buffer or neutralize the hydrogen ion resulting from the remaining free acid contained in cellulose diacetate.

The water-soluble salt and base to be used in the present invention are a salt and a base each having solubility in water at 25° C. of at least 3. Those having a pH buffering ability on free acid are preferably used.

To form a suitable buffer system in the dope, not only water-soluble salts or bases but also mixtures of water-soluble salts and bases, and further mixtures of water-soluble salts and acids can be used. Such mixtures are preferably used for the formation of the buffer system.

Water-soluble salts which can be used in the present invention are compounds comprising a basic group and an acid group. More specifically, the alkali metal, alkaline earth metal and ammonium salts of inorganic acids such as hydrochloric acid, sulfuric acid, phosphoric acid, carbonic acid, and the like and organic acids such as formic acid, acetic acid, propionic acid, butyric acid, citric acid, tartaric acid, malic acid, and the like can be used. Of these compounds, disodium hydrogen phosphate, sodium dihydrogen phosphate, dipotassium hydrogen phosphate, potassium dihydrogen phosphate, sodium carbonate, sodium acetate, potassium acetate, potassium carbonate, sodium hydrogen carbonate, and potassium hydrogen carbonate are particularly preferred. These compounds may be used alone or in combination of two or more thereof. Further, acids such as phosphoric acid, acetic acid and carbonic acid may preferably be added to these water-soluble salts.

Specific examples of bases which can be used in the present invention include sodium hydroxide, potassium hydroxide, calcium hydroxide, magnesium hydroxide and the like.

Representative examples of mixtures of water-soluble salts, mixtures of water-soluble salts and bases, and mixtures of water-soluble salts and acids are sodium carbonate/sodium hydrogen carbonate, sodium carbonate/sodium hydroxide, phosphoric acid/sodium dihydrogen phosphate or disodium hydrogen phosphate, and sodium acetate/acetic acid.

In the present invention, these water-soluble salts or bases are required to be contained in water to be used in preparation of the dope.

The water-soluble salt or base can be added to the water by the following method (1) or (2).

(1) A method in which the water-soluble salt or base is previously added to the water of the mixed solvent of acetone and water to be used in dissolving the cellulose diacetate flakes.

Although cellulose diacetate is usually dissolved in acetone, it is dissolved in a mixed solvent of acetone and about 2 to 14 wt % of water in order to maintain the dope viscosity at a low level. The water-soluble salt or base is dissolved in the water and the resulting aqueous solution is mixed with acetone. The solution thus prepared is used as the mixed solvent to obtain the dope.

(2) A method in which the water-soluble salt or base is added to a dope prepared by dissolving cellulose diacetate flakes in a mixed solvent of acetone and water.

A solution of acetone (or a mixed solvent of acetone and water) in which cellulose acetate flakes are previously dissolved in a high concentration, and water (or a mixed solvent of acetone and water) in which the water-soluble salt or base is previously dissolved are mixed in a predetermined ratio.

In the practice of the present invention, both of the methods (1) and (2) can be employed. The method (1) is more preferably employed.

The amount of cellulose diacetate added is generally 40 wt % or less, and preferably 20 to 30 wt %, based on the amount of the mixed solvent to be used.

The amount of the water-soluble salt or base added is preferably from $2 \times 10^{-4}$ to $1 \times 10^{-2}$ gram equivalent per kilogram of cellulose diacetate. If the amount is less than $2 \times 10^{-4}$ gram equivalent, the reduction of pH due to the free acid remaining in cellulose diacetate is prevented only insufficiently and thus in molding of fibers, films and the like, fiber breakage, the formation of fish eyes, and so forth occur. On the other hand, if it is more than $1 \times 10^{-2}$ gram equivalent, the water-soluble salt becomes insoluble in the mixed solvent of acetone and water and the degree of clearness of the dope drops. In some cases, a precipitate is formed. In the case of the base, the hydrolysis of cellulose diacetate occurs and gels are formed, and thus fiber breakage and fish eyes are formed.

In production of fibers, films and the like of cellulose diacetate formed by the process of the present invention, the formation of acetone-insoluble materials responsible for the fiber breakage and the formation of fish eyes can be prevented.

The present invention is described in greater detail with reference to the following examples.

EXAMPLE 1

100 Kilograms of cellulose diacetate flakes (acetyl value: 55.2%; free acid content: 0.03 wt %; water content: 2.3 wt %) was prepared.

33.1 Grams of disodium hydrogen phosphate and 5.7 g of phosphoric acid were dissolved in 1 liter of distilled water. The pH of the aqueous solution above obtained was 6.9. The aqueous solution was mixed with 320 liters of acetone by the use of a mixer and further 0.25 liter of water was added to prepare a mixed solvent of acetone and water.

100 Kilograms of the cellulose diacetate flakes as obtained above and 0.35 kg of ground pulp as a filtering aid were added to the mixed solvent of acetone and water and dissolved therein. Thereafter, filtration was carried out by a conventional method to obtain a dope. The dope thus obtained was dry spun through a spinning nozzle to obtain a monofilament having a fineness of 1.5 denier. Spinning was continued for 48 hours. No fiber breakage occurred. Spinnability was good.

The dope just before spinning was passed through a 2,600 mesh metal screen at 10.2 ml/min while maintaining it at 30° C. The pressure loss before and after the metal screen as generated after 30 minutes was 0.38 kg/cm².

EXAMPLE 2

100 Kilograms of cellulose diacetate flakes (acetyl value: 55.2%; free acid content: 0.03 wt %; water content: 3 wt %) was prepared.

An aqueous solution prepared by dissolving 20 g of sodium hydroxide (reagent grade No. 1, solid) in 8 liters of distilled water was mixed with 316 liters of acetone by the use of a mixer to prepare a mixed solvent of water and acetone. To the mixed solvent of acetone and water, 100 kg of the cellulose diacetate flakes as obtained above and 0.35 kg of a filtering aid were added and dissolved therein. The resulting solution was filtered by a conventional method to obtain a dope. The dope thus obtained was introduced in a spinning nozzle and dry spun to obtain a monofilament having a fineness of 1.67 denier. Spinning was continued for five days and nights. No fiber breakage occurred.

The dope just before spinning was passed through a 2,600 mesh metal screen at 10.2 ml/min while maintaining it at 35° C. After one hour, the pressure loss before and after the metal screen was measured and found to be 0.12 kg/cm². Solids caught by a fine filter provided just before the spinning nozzle were recovered and analyzed. Almost all of the solids were metal inorganic materials, and 5 wt % of the solids was a gel-like organic material insoluble in acetone.

COMPARATIVE EXAMPLE

100 Kilograms of cellulose diacetate flakes (acetyl value: 55.2%; free acid content: 0.03 wt %; water content: 3 wt %) were prepared.

To a mixed solvent of acetone and water which had been prepared by mixing 316 liters of acetone and 8 liters of water were added 100 kg of the cellulose diacetate flakes as obtained above and 0.35 kg of a filtering aid, and the resulting mixture was filtered by a conventional method to obtain a dope. Thereafter, dry spinning was carried out under the same conditions as in Example 1. Fiber breakage occurred five times.

The dope just before spinning was taken and passed through a 2,600 mesh metal screen at 10.2 ml/min while maintaining at 35° C. After one hour, the pressure loss before and after the metal screen was measured and found to be 2.7 kg/cm².

Solids caught by a fine filter provided just before the spinning nozzled were recovered and analyzed. As a result, 90 wt % of the solids was an acetone-insoluble gel-like organic material.

While the invention has been described in detail and with reference to specific embodiments thereof, it will be apparent to one skilled in the art that various changes and modifications can be made therein without departing form the spirit and scope thereof.

What is claimed is:

1. A process for producing a cellulose acetate molding material which comprises dissolving cellulose diacetate in a mixed solvent of acetone and water to prepare a dope and then dry spinning or dry film forming the dope, wherein at least one compound selected from the group consisting of water-soluble salts and bases is dissolved in the water to be used in preparation of the dope in an amount of $2 \times 10^{-4}$ to $1 \times 10^{-2}$ gram equivalent per kilogram of the cellulose diacetate thereby preventing formation of acetone-insoluble gels.

2. The process as in claim 1, wherein said water-soluble salts are selected from the group consisting of the alkali metal, alkaline earth metal and ammonium salts of hydrochloric acid, sulfuric acid, phosphoric acid, carbonic acid, formic acid, acetic acid, propionic acid, butyric acid, citric acid, tartaric acid, and malic acid.

3. The process as in claim 1, wherein said water-soluble salts are selected from the group consisting of disodium hydrogen phosphate, sodium dihydrogen phosphate, dipotassium, hydrogen phosphate, potassium dihydrogen phosphate, sodium carbonate, sodium acetate, potassium acetate, potassium carbonate, sodium hydrogen carbonate, and potassium hydrogen carbonate.

4. The process as in claim 1, wherein said bases are selected from the group consisting of sodium hydroxide, potassium hydroxide, calcium hydroxide and magnesium hydroxide.

5. The process as in claim 1, wherein said cellulose diacetate is added in an amount of 40 wt % or less to the mixed solvent of acetone and water.

6. The process as in claim 5, wherein said cellulose diacetate is added in an amount of 20 to 30 wt % to the mixed solvent.

7. The process as in claim 1, wherein the weight ratio of acetone to water in the mixed solvent is from 98:2 to 86:14.

8. The process as in claim 1, wherein said water-soluble salt or base acts to buffer or neutralize free hydrogen ion in the dope thereby inhibiting hydrolysis of the cellulose acetate.

9. The process as in claim 1, wherein said water-soluble salt or base is dissolved into the water to be used in preparation of the dope prior to dissolving the cellulose diacetate in the mixed solvent.

10. The process as in claim 1, wherein said water-soluble salt or base is dissolved into the water to be used in preparation of the dope after dissolving the cellulose diacetate in the mixed solvent.

* * * * *